H. A. BAKER.
WHEEL LOCKING DEVICE.
APPLICATION FILED MAY 2, 1921.

1,426,534.

Patented Aug. 22, 1922.

Inventor,
Howard A. Baker,
By Alfred Poole Whiton Attys.

UNITED STATES PATENT OFFICE.

HOWARD A. BAKER, OF EL PASO, TEXAS.

WHEEL-LOCKING DEVICE.

1,426,534.  Specification of Letters Patent.  Patented Aug. 22, 1922.

Application filed May 2, 1921. Serial No. 466,066.

*To all whom it may concern:*

Be it known that I, HOWARD A. BAKER, a citizen of the United States, and a resident of El Paso, in the county of El Paso and State of Texas, have invented certain new and useful Improvements in Wheel-Locking Devices, of which the following is a specification.

This invention relates to improvements in automobile wheel locking devices, and particularly to a lock designed to be applied to a wheel or wheels of the automobile to prevent the unauthorized movement thereof by locking such wheel or wheels from rotation.

The object of the invention is to provide a simple and inexpensive locking device that may be readily applied and removed, and capable of affording ample protection against theft, as well as being proof against attempt to render the device ineffective when applied.

A preferred form of the device is illustrated in the accompanying drawings together with disclosures as to the manner of application to the ordinary automobile.

In the drawings—

Figure 1:
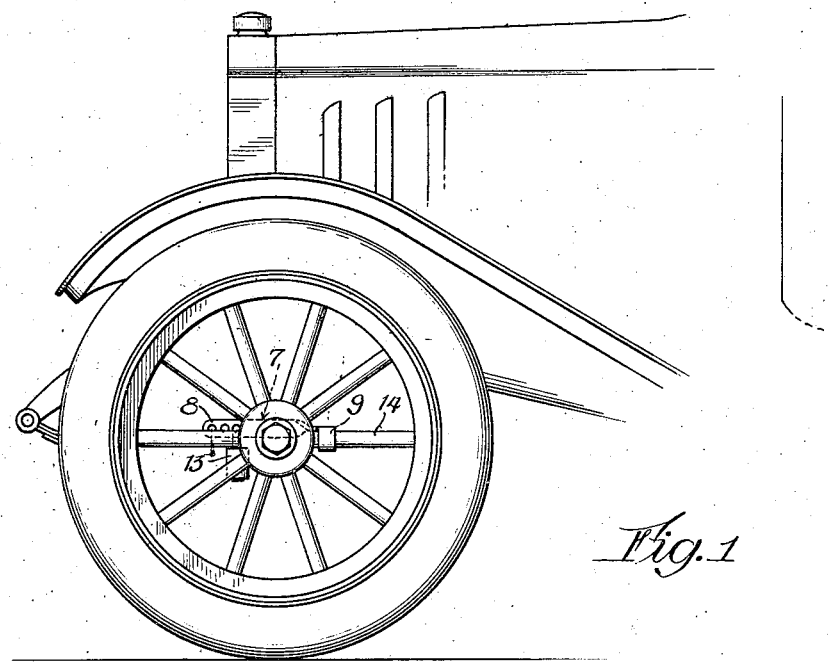
Fig. 1 is a view in side elevation of an automobile with locking device applied to one of the front wheels.
Figure 2:
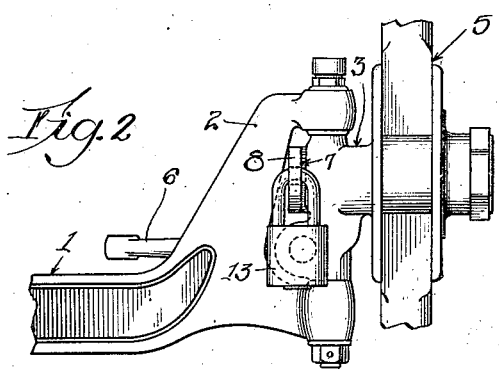
Fig. 2 is an enlarged view in front elevation of the end portion of the front axle and wheel.
Figure 3:
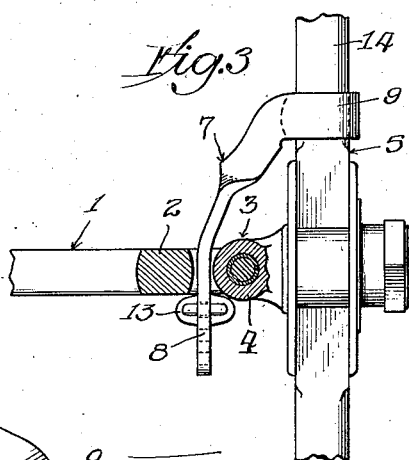
Fig. 3 is a top plan view of a wheel and axle showing the locking device in position.
Figure 4:
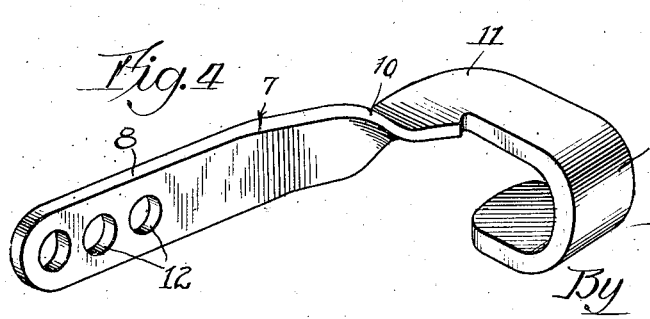
Fig. 4 is a perspective view of the locking bar.

The locking device is particularly designed for application to the front wheels of an automobile by reason of the fact that the front axle structure is such as to co-operate with the devices as a supporting member therefor, as will presently be set forth.

The ordinary makes of automobile follow a standard design so far as the front axle and wheel assembly is concerned, namely, that of a transverse axle 1 having at each end a U-shaped or forked extremity forming a yoke 2 which pivotally supports a T-shaped wheel supporting member 3 comprising a vertically disposed spindle 4 journalled in bearings at the ends of the arms of the yoke 2, and an axle extending transversely from the spindle, on which the wheel 5 is rotatively mounted. Although the design and details of construction may vary in different makes of automobile, there is ordinarily a comparatively narrow vertical space formed between the spindle 4 and the vertical portion of the yoke 2. In the drawing, this space is shown as tapered toward its upper end and from a point midway of the ends of the spindle at which point the steering knuckle 6 is fixed.

This space is utilized for the support of the locking device as will be fully disclosed, following a description of the device itself. In its simplest form the locking device is a metal bar 7 of suitable length, width, and thickness, depending on the size of the automobile, and its weight, these factors determining the relative proportion of the several parts as well as the strength required to resist attempted movement of the vehicle when the device is applied. Having determined, therefore, the size and dimensions of material for a device applicable to a certain make of automobile, the bar is shaped to provide a straight end portion or shank 8 and a hooked or U-shaped end portion 9. A particular relationship exists between these two main portions of the bar, which may best be described by assuming that the shank portion in normal position is maintained edgewise, that is, the edges of the bar are disposed vertically. Considered in this position, the U-shaped end portion of the device is offset laterally from the shank portion and the opening formed by bending the bar upwardly in U-shape, faces laterally, that is, in the direction of the prolongation of the shank. To obtain the formation thus described, the bar is first twisted through an angle of 90 degrees at a point 10 intermediate the shank and U-shaped portions, and immediately beyond the point of twist a bend of 90 degrees is made, as at 11. The hook proper is formed just beyond the bend and by reason of the intermediate twist and bend the hook is disposed in offset relation to the shank, as hereinbefore described. Formed in the shank 8 are a number of holes 12, spaced apart lengthwise, adjacent the outer end thereof. These holes are utilized to receive a padlock 13 which locks the bar in locking position, as will now be described.

The bar is applied by inserting the shank portion endwise and edgewise into the space between the spindle 4 and the axle 2 and at the same time passing the hooked end around a suitably positioned spoke 14 of one of the front wheels 5 near the hub of the wheel. The shank is preferably inserted into the space from the front side of the axle, and a forwardly extending spoke of the wheel engaged by the hooked end, these operations being accomplished simultaneously, or substantially so. After the shank is inserted and the spoke engaged, the padlock 13 is passed through one of the holes 12 in the shank 8 of the bar and preferably the one nearest the axle. The provision of more than one hole permits a certain longitudinal adjustment in the bar as would manifestly be desirable in applying the device to different makes of automobile.

The hooked end of the bar engaging a spoke, the shank wedged between the spindle and the axle, and locked from endwise movement by means of the padlock, provides a secure lock for the wheel which cannot be readily detached or the spoke released without removing the padlock. The function of the bar in locking the wheel from rotation is obvious, acting as it does in the nature of a rigid and fixed arm, engaging the wheel at a point radially removed from its axis of rotation.

Manifestly certain departures may be resorted to without departing from the spirit of the invention; for instance, more than one hooked portion may be provided for locking with more than one spoke, or in place of a hooked spoke engaging portion, a wheel engaging portion extending between two spokes, and having an offset or hooked end portion in snug contact with the wheel hub, thereby preventing the rotation of the wheel, as well as its removal from rotation. For this reason it is not my wish to limit the invention except in so far as set forth in the appended claims.

Having described a preferred form of the device and method of application, what I claim as new and novel is—

1. An automobile locking device comprising a bar having a shank portion, and a wheel engaging portion at one end, said shank portion being insertable between non-rotative parts of the axle, and the wheel engaging portion in locking connection with a wheel, and means for locking said bar in wheel locking position.

2. An automobile locking device consisting of a bar having a shank portion and a hooked end portion, the former being insertable endwise between two parts of the axle, and the hooked end engaging a wheel spoke, and locking means adapted to be applied to the free end of said shank after the bar has been inserted into locking position.

3. An automobile locking device consisting of a bar having a hooked extremity adapted to fit around a wheel spoke, a shank portion extending transversely to said hooked portion and adapted to be inserted through a relatively narrow space between parts of the axle adjacent said wheel, and a locking member adapted to be applied to the free end of said shank subsequent to the application of the bar in locking position.

4. A locking device for automobiles consisting of a rigid bar adapted to be non-rotatably inserted through the space between the end of the axle and the wheel spindle, one end of said bar having a hooked portion adapted to engage a wheel spoke, the other end of said bar being provided with an opening to receive a padlock thereby locking said bar from removal.

5. An automobile locking device consisting of a bar having a shank portion and a U-shaped end portion, the former being adapted to be wedged edgewise between vertically arranged parts of the axle with the U-shaped end portion engaging an adjacent wheel spoke, and a locking member adapted to be secured to the free end of said shank after the same is in locking position.

6. An automobile locking device comprising a bar shaped to form a straight shank portion and a U-shaped end portion adapted to fit around a wheel spoke, said shank portion being adapted to be wedged edgewise through the vertical space between the axle yoke and spindle, and said U-shaped portion to engage a substantially horizontally positioned spoke of the wheel, and a padlock adapted to be locked through an opening in the free end portion of said shank portion after said bar is in locking position.

7. A locking device for automobiles consisting of a bar having a shank and a hooked portion at one end offset laterally from said shank and having the opening thereof facing in the direction of said shank, the free end of said shank being adapted to be inserted endwise between the end of the wheel axle and the wheel spindle, and a padlock adapted to be attached at the free end of the shank after it has been inserted and said hooked portion engaged with a wheel spoke.

8. A wheel locking device for vehicles comprising a bar adapted to be inserted endwise between the wheel axle and spindle, and provided at one end with an offset portion extending between the spokes of the wheel, and means for locking said bar from withdrawal from between said axle and spindle.

9. A wheel locking device for vehicles, comprising a bar having a shank portion adapted to be inserted endwise into a space between the end of the vehicle axle and the adjacent wheel spindle, and a wheel engaging portion extending transversely to said shank portion, and a locking member adapted to be attached to the free end of said shank portion beyond said space between the axle and spindle.

10. A wheel locking device for vehicles comprising a bar having one end portion bent at substantially right angles, and a plurality of holes at the other end, said bar being adapted to be inserted between the end of the vehicle axle and the vehicle spindle with said end portion engaging between two spokes of the wheel, and a padlock adapted to be locked in one of said holes, in said bar, on the opposite side of said axle from the end portion thereof.

11. An automobile locking device comprising a bar bent to form a straight shank portion adapted to be inserted endwise between the front axle and wheel spindle, and a wheel engaging portion adapted to extend between two of the spokes adjacent the hub, and having a hooked end adapted to engage the wheel, and means for locking said bar from withdrawal from between said axle and wheel spindle.

12. An automobile locking device comprising a bar having a shank portion, and a wheel engaging portion, said shank adapted to be inserted endwise between the automobile axle and wheel spindle, with said wheel engaging portion extended between the wheel spokes in the form of a hook engaging the outside of said wheel, and means for locking said bar from withdrawal from between said axle and wheel spindle.

In witness whereof, I hereunto subscribe my name this 26th day of April, A. D., 1921.

HOWARD A. BAKER.